Aug. 29, 1950 R. A. FINDLAY 2,520,391
LIQUID-LIQUID CONTACTING
Filed Jan. 20, 1947 2 Sheets-Sheet 2

INVENTOR.
R. A. FINDLAY
BY
Hudson & Young
ATTORNEYS

Patented Aug. 29, 1950

2,520,391

UNITED STATES PATENT OFFICE 2,520,391

LIQUID-LIQUID CONTACTING

Robert A. Findlay, Bartlesville, Okla., assignor to Phillips Petroleum Company, a corporation of Delaware Application January 20, 1947, Serial No. 723,066

7 Claims. (Cl. 261—114)

This invention relates to liquid-liquid contacting, that is, to the contacting of two immiscible liquids of different specific gravities such as extraction of a liquid feed mixture with a liquid selective solvent for a component or components of the feed or the chemical treatment of a liquid with another liquid. The present invention relates both to the apparatus for carrying out such liquid-liquid contacting and also to the method.

The principal object of the present invention is to provide an improved apparatus and method for conducting liquid-liquid contacting. Another object is to provide an improved method and apparatus for conducting continuous countercurrent contacting of two immiscible liquids having different specific gravities. Another object is to effect such liquid-liquid contacting in equipment which is simple and economical to construct and maintain. Another object is to provide a method for liquid-liquid contacting which is simple and highly effective. Numerous other objects will more fully hereinafter appear.

Figure 1:
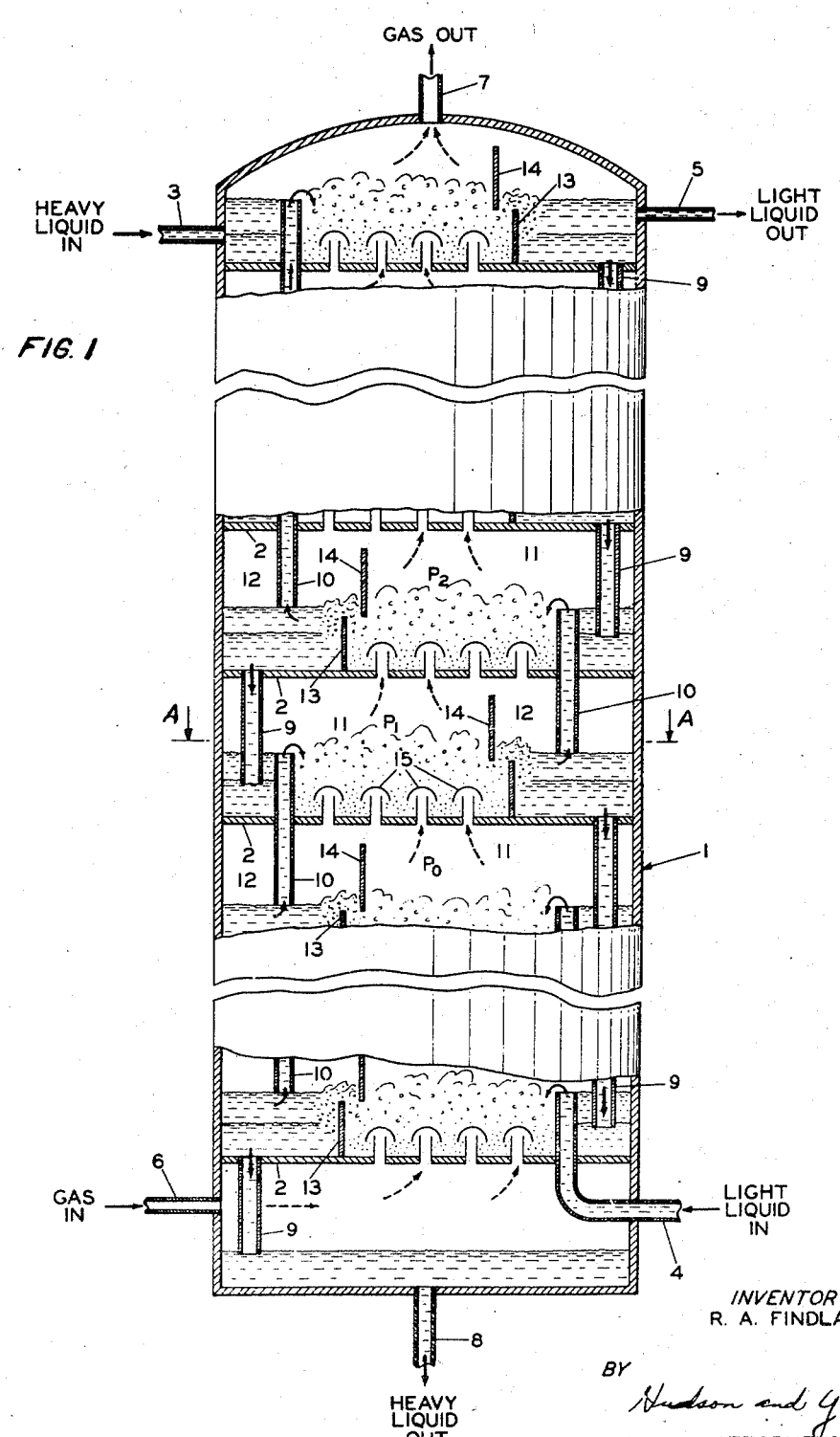
Figure 2:
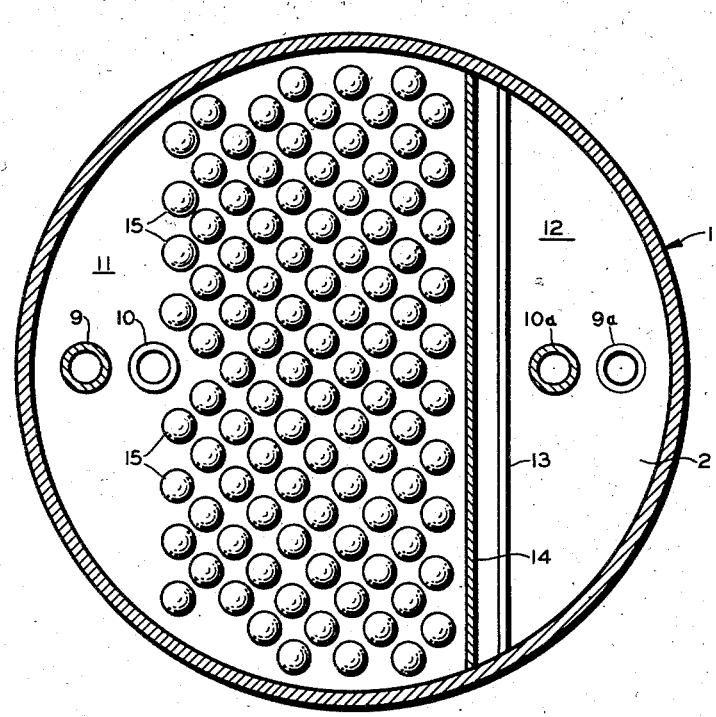

Figure 1 is a longitudinal vertical section of one arrangement of equipment which may be used for carrying out liquid-liquid contacting in accordance with the present invention. On the drawing the dotted arrows denote flow of gas, the light arrows flow of light liquid and the heavy arrows flow of heavy liquid. Figure 2 is a slightly enlarged horizontal cross section of the column shown in Figure 1 taken along lines A—A and shows the construction of one zone of the column.

I have developed a liquid-liquid contacting tower which shows very considerable advantage over previously-used towers such as packed columns, perforated plate columns, etc. The column of my invention provides rapid and intimate mixing of the two liquids on each plate of the column and insures against channelling through the column. The principle of the column of my invention is to use a gas to produce vigorous and intimate mixing of the two immiscible liquids on a modified bubble-cap tray. This gas may be entirely extraneous, e. g., air, nitrogen, carbon dioxide, fuel gas or flue gas, or may be produced by partial boiling of one of the liquids being treated. The sole function of the gas used in my invention is the mechanical one of promoting mixing. The gas should be inert with respect to the two liquids.

The apparatus of my invention is a vertical column divided into superimposed zones by a plurality of horizontal trays for the continuous countercurrent contacting of two immiscible liquids having different specific gravities. Each of the zones formed by the trays is divided into two sections, namely, a mixing or contacting section and a settling section. The lighter liquid is continuously introduced under sufficient pressure into the bottom of the column to cause same to flow upwardly through the column, passing progressively from a lower tray to one next above. The heavier liquid is introduced to the top of the column and is passed therethrough from the uppermost tray to the one therebelow and so on to the bottom of the column. Each tray is provided with suitable gas inlets such as bubble caps, spray nozzles, and the like, for passing an agitating gas through the liquid on the trays thereby causing efficient mixing and contacting of the two liquids. The gas used for such agitation and mixing may be introduced in the bottom portion of the column and passes upwardly progressively from one tray to another. The lighter liquid introduced in the bottom of the column passes through suitable risers located wholly within the column into the zones formed between consecutive trays. Heavy liquid coming from the top of the column also enters these zones and passes along with the light liquid across the gas inlets into the settling sections which are preferably set off from the contacting sections by dams extending upwardly from the horizontal trays and also by splash plates extending downwardly to a point below the tops of the dams. The purpose of separating the settling sections from the contacting sections is to maintain a quiescent condition in the settling sections. The heavier liquid settles to the bottom of these sections and flows through downflow pipes or downcomers to the tray therebelow, while the lighter liquid flows through upflow pipes or risers to the trays thereabove.

The tower is substantially self-adjusting as regards liquid levels. The heavier liquid will maintain a head in the downcomers sufficient to produce a flow equal to its feed rate. The level of the lighter liquid on the tray will adjust itself according to its feed rate. At high flows of light liquid the level on the tray will rise, thus decreasing the effective head of light liquid between trays opposing the upflow and permitting higher upward flow. Tray level will also depend on the gas flow rate, the latter being adjusted to an amount sufficient for good mixing. The size of the various pipes, downcomers and risers, bubble-cap slots, etc., are chosen to handle the flows required for the individual design.

The tower may be used for any type of countercurrent liquid-liquid extraction, either simple extraction or that type of extraction wherein the feed is introduced into the middle of the column and reflux is introduced at the bottom to increase the degree of separation. The column may be used to separate different types of hydrocarbons using a suitable selective solvent for one type of hydrocarbon. For example, it may be used to separate naphthenes from paraffins or to separate aliphatic hydrocarbons of different degrees of unsaturation such as to effect the separation of butadiene from normal butylenes. The column may also be used to carry out treating operations wherein a liquid feed is treated with a liquid reagent such as the treatment of hydrocarbons with caustic to remove hydrogen sulfide, treatment of hydrocarbons with sulfuric acid, etc. The invention may also be employed for carrying out reactions between hydrocarbons using a liquid catalyst. For example, it may be used to conduct hydrofluoric acid or sulfuric acid alkylation of isoparaffins with low-boiling olefins; thus the butanebutylene feed may be introduced into the bottom of the column as the light liquid and may ascend the column countercurrently to the liquid acid catalyst, the reaction taking place as the contact occurs.

I prefer to have the equipment so designed and to introduce the gas in such manner that the two liquids are churned into a mass of foam or froth above the bubble caps. The gas then separates from this mass of foam and the resulting liquid mixture passes into the settling section of each tray where it is separated into the lighter liquid which goes up to the next higher tray and the heavier liquid which passes down to the next lower tray.

I prefer to have the risers and downcomers feed each tray on one side of the column and to alternate the point of entry of the two liquids from side to side of the column as they proceed either upwardly or downwardly through the column. I generally bring the light liquid and the heavy liquid in at points closely adjacent one another and located on the opposite side of the tray from the settling section. The bubble caps are located between the points where the liquids enter and the settling section.

I have found it preferable to have the risers extend upwardly above the trays to a point well above the lower ends of the downcomers so that any tendency of the heavier liquid to pass down the risers (or for that matter of the lighter liquid to pass up the downcomers) is eliminated. This prevents channelling or short-circuiting through the column.

In some cases, for example where a feed mixture containing a readily vaporizable component in admixture with a less readily vaporizable material, such as natural gasoline, is being treated with a suitable liquid selective solvent or reagent, I may form the gas introduced into the bottom of the column by reducing the pressure on the top of the column whereby the more readily vaporizable component is withdrawn from the column as a gas. I then inject this gas into the bottom of the column for producing the intimate contacting of the two liquids on each of the trays as it passes upwardly in the column.

The pressure at which the gas is introduced into the bottom of the column must be sufficient to overcome the pressure drop through all of the bubble caps of the column. If the column is being operated at superatmospheric pressure, as is necessary to maintain liquid conditions in the case where a liquefied normally gaseous material such as butane is being treated, the pressure at which the gas is introduced must be sufficient to overcome the pressure drop through the bubble caps plus the operating pressure of the column. The light liquid must be introduced under pressure sufficient to overcome its pressure drop through the column. In practice the gas and the lighter liquid are introduced at substantially the same pressure. In case they are introduced at different pressures, their pressures equalize in the first zone where they come in contact with each other. It is understood, of course, that only sufficient pressure is used on the lighter liquid and gas to enable them to pass upwardly through the column and it is not of sufficient force to push the heavier liquid out the top of the column. Such pressure depends on the liquids being contacted and may be readily determined by one skilled in the art.

The heavy liquid is introduced under pressure sufficient only to get it into the column. If the column is operated at atmospheric pressure, the heavier liquid is introduced at substantially no pressure. Once the heavier liquid has been introduced into the top of the column, reliance is placed solely upon gravity to cause it to flow down the column. In the case of the lighter liquid, it flows up the column solely under the influence of the slight head required to cause it to pass up through the column. It is to be distinctly understood that the light liquid is not in any sense forced up the column by the gas.

In Figure 1 the vertical column 1 is provided with a plurality of horizontal trays 2. Heavy liquid is introduced into the top section of the column by means of line 3. Light liquid is introduced into the bottom of the column by means of line 4. While in the drawing the light liquid enters the bottom and immediately passes up to above the first tray, it will be understood that other equivalent arrangements may be employed. For example the light liquid may be pumped into the extreme bottom section of the column and a riser similar to the risers 10 shown used to convey it above the first tray. Light liquid leaves the top of the column via line 5. Gas enters the bottom of the column via line 6 and leaves the top of the column via line 7. Heavy liquid leaves the bottom of the column via line 8.

Each of the trays 2 is provided with a downcomer or pipe 9 for heavy liquid which may be a cylindrical, rectangular, or similarly shaped, hollow conduit. This pipe 9 may be flush with the top edge of the tray 2 as shown and it extends below the liquid level on the next lower tray for a suitable distance in known manner to effect the seal. The lower end of pipe 9 may be coextensive, or substantially so, with the interface between the layers of heavy and light liquid on the next lower tray.

The trays 2 are also provided with pipes 10 which may be of a shape similar to downcomer 9 for conveying the light liquid upwardly from tray to tray. Risers or pipes 10 may terminate at their top at a point coextensive with the level of lighter liquid and may terminate at their lower ends similarly at a point coextensive with the level of the lighter liquid.

The pipes 9 and pipes 10 which feed a given tray 2 are located on the same side of the column 1 and as shown these alternate from side to side as one passes upwardly or downwardly through the column. Each of the trays is divided into a contacting space 11 and a settling space 12. The division is conveniently accomplished by means of dams 13 which extend upwardly from each tray to a point near the level of liquid to be maintained and splash plates 14 which begin at a point well below each tray so as to allow equalization of gas pressure between the two sections 11 and 12 and extend downwardly to a point below the level of liquid to be maintained on the trays and usually below the tops of the dams 13. Dams 13 and splash plates 14 preferably take the form of vertical plates extending across the column 1 and welded at its sides. As shown, plates 13 and 14 are arranged parallel to one another and are spaced slightly apart so as to allow the mixed heavy and light liquids to flow therebetween and thereby obtain access to the settling section 12.

Between the dams 13 and splash plates 14 on the one hand and the points at which the pipes 9 and pipes 10 empty onto each tray 2, a plurality of bubble caps 15 are mounted on the upper side of each tray 2. Each of these bubble caps 15 has the usual riser for conveying gas from the gas space above the next lower tray into the bubble cap and thence into the heavy and light liquids flowing there across. In this way the gas churns the heavy and light liquid into a mass resembling froth or foam thereby obtaining very intimate contact and good mass transfer between the two liquid phases. The dams 13 and the splash plates 14 prevent this vigorous agitation from interfering with maintenance of quiescent conditions in the settling sections 12.

The order of magnitude of the velocities of the light and heavy liquids is sufficiently high that unduly large downcomers and risers are not required, even allowing for some friction loss. For instance at a velocity of 4 ft. per second a 2" pipe will carry 40 gallons per minute of water with a head loss of only 0.08 foot across an 18" length (i. e. less than 1 inch loss in head). This would amount to 1370 barrels per day flow of each of light and heavy liquid through the risers 10 and downcomers 9.

Refer now to Figure 2 which is an enlarged horizontal cross section taken along line A—A of the column shown in Figure 1. Those pieces of apparatus which have counterparts in Figure 1 are similarly numbered. Lighter liquid enters contacting section 11 through riser 10, and heavier liquid enters this section through downcomer 9. By means of suitable pressure upon the lighter liquid causing it to seek exit from each section of column by passing upward and by the effect of gravity on the heavier liquid, the two liquids are caused to flow across contacting section 11 and over and around bubble caps 15 and into settling section 12. To enter the quiescent settling section the two liquids, which are intimately mixed by the passage of a gas through the bubble caps, must pass under splash plate 14 and over dam 13. In this manner the turbulence of the liquids is considerably reduced, and more rapid settling is obtained. From settling zone 12 the heavy liquid passes downwardly through the downcomer indicated as 9a which is identical to 9. the suffix being added only to differentiate between the two, and passes to the contacting zone of the next lower tray. The lighter liquid which comes to the top in the settler passes to the contacting section of the tray next above through riser 10a. The suffix was added to the 10 for the same reason it was added to 9.

Pressure drop across the tray is caused by gas flow, and is equal to the head due to liquid level on the tray (say 4 inches) plus the resistance through the vapor risers and bubble caps. The latter can be made any desired figure by increasing the resistance to gas flow for example within the slot area of the bubble caps or by putting orifices in the vapor risers. Such orifices may take the usual form of plates with one or more holes of desired size across the vapor risers. The size of the orifices would depend on the amount of gas flowing which in turn would depend on the degree of mixing desired.

If pressure drop gets too high the heavy liquid may tend to pile up on the trays. However tray level will fall due to excessive light liquid flow thus decreasing pressure drop. At the limit gas would by-pass up the liquid risers which would do no particular harm since there would still be flow of gas through all the bubble caps.

The downcomers and risers have been shown as taking the form of cylindrical pipes, however, it will be understood that this is for purposes of illustration only and that they may take any suitable form as is well known to those skilled in the art. In many cases it will be found preferable to have the downcomers formed by welding a partition across one side of the column on a chord thereof to form what are often termed "segmental downcomers" in fractional distillation practice. In such case it may be highly desirable to have the risers take the form of rectangular pipes extending across the column parallel to the segmental downcomers and located a short distance toward the center of the column therefrom. Such segmental downcomers and rectangular risers are to be preferred to a plurality of cylindrical tubes because they are simpler to install and maintain and involve less consumption of metal. Thus the metal requirements for a single rectangular riser having a given cross-sectional area are much less than for a plurality of cylindrical risers having the same cross-sectional area.

In some cases I may convert an existing fractional distillation column of the bubble-tray type to liquid-liquid extraction service in accordance with the present invention. This may be done with a minimum of modification by removing some of the bubble caps and plugging the holes left, inserting risers for the light liquid inwardly of the downcomers and installing splash plates such as are shown in the drawing. The usual fractional distillation column of the bubble-cap type already has dams to hold the liquid level above the caps at the correct level. It may be necessary to relocate such dams inwardly of the risers and it may be necessary also to change the height of such dams for practicing the present invention.

As briefly mentioned above, my invention may be practiced either with simple contacting wherein the lighter liquid is introduced to the bottom of the column or that type of contacting wherein the feed is introduced to an intermediate point in the column and reflux is introduced into the bottom of the column to enhance the degree of separation effected. This reflux may be obtained in any known manner from the heavier liquid withdrawn from the bottom of the column. For example, in the case of extraction with a selective solvent, the extract leaving the bottom of the column may be passed to a separate stripping zone wherein the dissolved portion of the lighter liquid may be recovered from the solvent by application of heat, the stripped solvent being recycled to the contacting column. A portion of this lighter liquid so recovered may be continuously returned to the bottom of the column as the reflux liquid. The reflux may be introduced at the point where the lighter liquid would normally be introduced in simple contacting without reflux, for example on the lowermost tray of the column, as would be the case where the reflux were fed in via pipe 4 in the drawing.

From the foregoing description it will be seen that the present invention provides a highly effective and simple apparatus and method for carrying out liquid-liquid contacting. The principal advantage of the present invention is that the gas is caused to effect very vigorous agitation of the light and heavy liquids into a mass of foam or froth with resulting good contact therebetween. Another advantage is that the equipment requirements are simple, require a minimum of maintenance and are adapted to extremely long life. Another advantage is that the liquid levels are self-adjusting so that operation to produce effective liquid-liquid contacting is very simple. Many other advantages of the present invention will be apparent to those skilled in the art.

I claim:

1. Apparatus for continuous countercurrent contacting of two immiscible liquids having different specific gravities comprising a vertical column having a plurality or horizontal trays dividing same into a plurality of superimposed zones, a dam dividing each of said zones into a contacting section and a settling section, means attached to the contacting sections of said trays through which a gas may be passed and which by such passage of gas will cause turbulent contacting of materials therearound, inlet means for continuously introducing heavier liquid into the top of said column, means for continuously introducing lighter liquid into said column at a point substantially below the point at which said heavier liquid is introduced, outlet means for continuously withdrawing lighter liquid from the top of said column, outlet means for continuously withdrawing heavier liquid from the bottom of said column, means within said column for conveying heavier liquid from each settling section into the contacting section of the next lower zone, means within said column for conveying lighter liquid from each settling section into the contacting section of the next higher zone, means for applying sufficient pressure upon said lighter liquid to force same through said conveying means, means for introducing a gas to said column at a point substantially below the point at which said heavier liquid is introduced, means for applying sufficient pressure to said gas to cause same to flow upwardly through said trays and thereby providing intimate and thorough mixing of the heavier and the lighter liquids as they flow through said contacting sections.

2. Apparatus for continuous countercurrent contacting of two immiscible liquids having different specific gravities comprising a vertical column having a plurality of horizontal trays dividing same into a plurality of superimposed zones, a dam dividing each of said zones into a contacting section and a settling section, bubble caps attached to the contacting sections of said trays through which a gas may be passed and which by such passage of gas will cause turbulent contacting of materials therearound, inlet means for continuously introducing lighter liquid into the bottom of said column, means for continuously introducing heavier liquid into the top of said column, means for continuously withdrawing lighter liquid from the top of said column, means for continuously withdrawing heavier liquid from the bottom of said column, means within said column for conveying heavier liquid from each settling section into the contacting section of the next lower zone, means within said column for conveying lighter liquid from each settling section into the contacting section of the next higher zone, means for applying sufficient pressure upon said lighter liquid to force same through said conveying means and through said outlet means, means for introducing a gas to said column at a point substantially below the point at which said heavier liquid is introduced, means for applying sufficient pressure to said gas to cause same to flow upwardly through the bubble caps and thereby causing intimate and thorough mixing of the heavier and the lighter liquids as they flow across said bubble caps.

3. Apparatus for continuous countercurrent contacting of two immiscible liquids having different specific gravities comprising a vertical column having a plurality of horizontal trays dividing same into a plurality of superimposed zones, means dividing each of said zones into a contacting section and a settling section, said last-named means comprising a vertical dam extending upwardly from each tray to a point approaching the liquid level to be maintained in the settling section and a vertical splash plate located in the gas space in the upper portion of each zone and extending downwardly to a point below the top of said dam, said splash plate being located on the contacting section side of said dam, means for continuously introducing lighter liquid under pressure into the bottom of said column, means for continuously introducing heavier liquid into the top of said column, means for continuously introducing gas under pressure into the bottom of said column, means for continuously withdrawing lighter liquid from the top of said column, means for continuously withdrawing heavier liquid from the bottom of said column, means for continuously withdrawing gas from the top of said column, risers located wholly within said column for conducting lighter liquid from each of said settling sections into the contacting section of the next higher zone, downcomers located wholly within said column for conducting heavier liquid from each of said settling sections into the contacting section of the next lower zone, said risers terminating at their upper end at points on the trays adjacent the points of termination of said downcomers at their lower end, bubble caps on each of said trays and located in the contacting section of each of said zones between the downcomer from the next higher zone and the riser from the next lower zone on the one hand and said dam and splash plate on the other hand, the arrangement being such that said gas passes upwardly sequentially from zone to zone through said bubble caps and effects intimate and thorough admixing of said liquids around and above said bubble caps as said heavier and lighter liquids flow across said bubble trays after leaving the downcomers and risers into said settling sections whence the separated lighter liquid ascends the riser to the next higher tray and the separated heavier liquid descends the downcomer to the next lower tray.

4. Apparatus as in claim 3 wherein said risers extend upwardly above the trays to a point well above the lower ends of said downcomers whereby tendency of the heavier liquid to pass down the risers is eliminated.

5. Apparatus as in claim 3 wherein the downcomer and riser feeding each tray are on the same side of said column and wherein the downcomers and risers feeding the trays alternate from one side of the column to the other in ascending the column.

6. Apparatus for continuous countercurrent contacting of two immiscible liquids having different specific gravities comprising a vertical column having a plurality of horizontal trays dividing same into a plurality of superimposed zones, a dam and a splash plate dividing each of said zones into a contacting section and a settling section, bubble caps attached to the contacting sections of said trays through which a gas may be passed and which by such passage of gas will cause turbulent contacting of materials therearound, inlet means for continuously introducing lighter liquid into an intermediate point in said column, inlet means for continuously introducing heavier liquid into the top of said column, outlet means for continuously withdrawing lighter liquid from the top of said column, outlet means for continuously withdrawing heavier liquid from the bottom of said column, means for continuously introducing reflux into the bottom of said column, means within said column for conveying heavier liquid from each settling section into the contacting section of the next lower zone, means within said column for conveying lighter liquid from each settling section into the contacting section of the next higher zone, means for applying sufficient pressure upon said lighter liquid to force same through said conveying means and through said outlet means, means for introducing a gas to said column at a point substantially below the point at which said heavier liquid is introduced, means for applying sufficient pressure to said gas to cause same to flow upwardly through the bubble caps and thereby causing intimate and thorough mixing of the heavier and the lighter liquids as they flow across said bubble caps.

7. A method of carrying out continuous countercurrent contacting of two immiscible liquids one of which comprises a readily vaporizable component having different specific gravities in a separation zone divided into a plurality of superimposed zones, each of which comprises a contacting zone and a settling zone, which comprises continuously introducing lighter liquid under pressure into the bottommost of said series of superimposed zones, continuously introducing heavier liquid into the topmost of said superimposed zones, continuously introducing a gas under pressure into the bottom of said separation zone, passing lighter liquid upwardly within said separation zone from each settling zone into the next higher zone and heavier liquid downwardly within said separation zone from each settling zone into the next lower zone, passing said heavier and lighter liquids across the flow of gas through each superimposed zone into said settling zone effecting therein stratification of said light and heavy liquids, passing said gas from the contacting zone of a lower zone upwardly through each superimposed zone into the contacting zone thereabove and as it so passes intimately and thoroughly mixing said heavier and lighter liquids as they are so flowing across the contacting zone, continuously withdrawing heavier liquid from the bottom of said separation zone, continuously withdrawing lighter liquid from the top of said separation zone, continuously withdrawing from the top of said separation zone said gas which has passed through said zone in the manner described, maintaining the pressure within said column such that the readily vaporizable component within said liquid is separated therefrom as a gas, and employing this gas as the gas introduced into the bottom of said column to provide contacting of said liquids.

ROBERT A. FINDLAY.

REFERENCES CITED

The following references are of record in the file of this patent:

UNITED STATES PATENTS

| Number | Name | Date |
|---|---|---|
| 1,865,024 | Lebo | June 28, 1932 |
| 1,951,787 | Child | Mar. 20, 1934 |
| 2,257,283 | Snow | Sept. 30, 1941 |